US012784264B2

(12) United States Patent
Monaco et al.

(10) Patent No.: US 12,784,264 B2
(45) Date of Patent: Nov. 3, 2026

(54) METHOD FOR CORRECTING A POSE OF A MOTOR VEHICLE, A COMPUTER PROGRAM PRODUCT, AS WELL AS AN ASSISTANCE SYSTEM

(71) Applicant: ROBERT BOSCH GMBH, Stuttgart (DE)

(72) Inventors: Christopher Monaco, Sunnyvale, CA (US); Arun Das, San Jose, CA (US); Maximilian Muffert, Belmont, CA (US); Ryan Soussan, San Francisco, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 114 days.

(21) Appl. No.: 18/730,952

(22) PCT Filed: Jan. 20, 2023

(86) PCT No.: PCT/EP2023/051322
§ 371 (c)(1),
(2) Date: Jul. 22, 2024

(87) PCT Pub. No.: WO2023/144023
PCT Pub. Date: Aug. 3, 2023

(65) Prior Publication Data
US 2025/0104273 A1 Mar. 27, 2025

(30) Foreign Application Priority Data
Jan. 25, 2022 (GB) ...................................... 2200894

(51) Int. Cl.
*G06T 7/73* (2017.01)
*G01C 21/30* (2006.01)
(Continued)

(52) U.S. Cl.
CPC ................ *G06T 7/73* (2017.01); *G01C 21/30* (2013.01); *G06V 10/764* (2022.01); *G06V 20/56* (2022.01); *G06T 2207/30252* (2013.01)

(58) Field of Classification Search
CPC ... G06T 7/73; G06T 2207/30252; G06T 7/75; G06T 2207/20164; G01C 21/30; G06V 10/764; G06V 20/56; G05D 1/02
See application file for complete search history.

(56) References Cited

U.S. PATENT DOCUMENTS 10,810,445 B1 10/2020 Kangaspunta
11,966,234 B2 * 4/2024 Guizilini .................. G06T 7/11
(Continued)

FOREIGN PATENT DOCUMENTS

CN 109584302 A 4/2019
CN 113920198 A 1/2022

OTHER PUBLICATIONS

Markus Herb, Semantic Image Alignment for Vehicle Localization, Oct. 8, 2021.*
(Continued)

*Primary Examiner* — Abdalla A Khaled
(74) *Attorney, Agent, or Firm* — NORTON ROSE FULBRIGHT US LLP

(57) ABSTRACT

Method for correcting a pose of a motor vehicle, comprising receiving first data of semantic contour image measurements, receiving second data of an initial pose estimate, receiving third data of semantically labeled map elements, generating a score image and/or an error image and its image derivatives based on the first data, generating expected three-dimensional points of the map elements at the initial pose estimate based on the second data and third data, comparing the expected three-dimensional points of the map elements with the score image and/or the error image and its image derivatives to perform model-to-image alignment,
(Continued)

based at least in part on projecting the expected three-dimensional points into the score image and/or the error image and using the score image and/or the error image and its image derivative to perform an iterative optimization, and transmitting the alignment's resulting pose correction and pose correction uncertainty to the assistance system.

11 Claims, 3 Drawing Sheets

(51) Int. Cl.
*G06V 10/764* (2022.01)
*G06V 20/56* (2022.01)

(56) References Cited

U.S. PATENT DOCUMENTS

| | | | | |
|---|---|---|---|---|
| 2018/0029432 | A1* | 2/2018 | Kondo | B60G 17/0162 |
| 2018/0165831 | A1* | 6/2018 | Kwant | G01C 21/165 |
| 2018/0336697 | A1* | 11/2018 | Lu | G06T 7/73 |
| 2019/0080467 | A1* | 3/2019 | Hirzer | G06T 7/73 |
| 2019/0221000 | A1* | 7/2019 | Li-Chee-Ming | G06T 7/75 |
| 2019/0325597 | A1* | 10/2019 | Chakravarty | H04N 13/289 |
| 2020/0089236 | A1* | 3/2020 | Doemling | G01C 21/30 |
| 2020/0184682 | A1* | 6/2020 | Xiong | G06T 7/251 |
| 2020/0250439 | A1* | 8/2020 | Vig | G05D 1/0246 |
| 2020/0257900 | A1* | 8/2020 | Dubroy | G06T 5/50 |
| 2020/0285247 | A1* | 9/2020 | Tan | G05D 1/0088 |
| 2020/0310454 | A1* | 10/2020 | Oguro | B60W 30/0956 |
| 2020/0340817 | A1 | 10/2020 | Schomerus | |
| 2020/0372285 | A1* | 11/2020 | Adams | G06V 20/582 |
| 2021/0240195 | A1* | 8/2021 | Atherton | G05D 1/0038 |
| 2021/0398302 | A1* | 12/2021 | Guizilini | G06T 3/18 |
| 2022/0012909 | A1* | 1/2022 | Yan | G06T 7/73 |

OTHER PUBLICATIONS

International Preliminary Report on Patentability issued Jul. 30, 2024 in Intl. Appl. No. PCT/EP2023/051322.

International Search Report issued May 10, 2023 in Intl Appl. No. PCT/EP2023/051322.

Xiao Zhongyang et al., "Monocular Vehicle Self-localization method based on Compact Semantic Map," 2018 21st International Conference on Intelligent Transportation Systems, pp. 3083-3090, Nov. 4, 2018.

Search Report issued Jul. 29, 2022 in GB Appl. No. 2200894.0.

* cited by examiner

METHOD FOR CORRECTING A POSE OF A MOTOR VEHICLE, A COMPUTER PROGRAM PRODUCT, AS WELL AS AN ASSISTANCE SYSTEM

FIELD OF THE INVENTION

The invention relates to the field of automobiles. More specifically, the invention relates to a method for correcting a pose of a motor vehicle in the surroundings of the motor vehicle by an assistance system of the motor vehicle, as well as to a computer program product and an assistance system.

BACKGROUND INFORMATION

Partially autonomous motor vehicles or fully autonomous motor vehicles fundamentally depend on precise estimates of their pose, in particular of position and orientation of the motor vehicle, within a map. Therefore, there is a need in the art to provide a method by which a precise pose estimation is realized.

SUMMARY OF THE INVENTION

It is an object of the invention to provide a method, a computer program, as well as a corresponding assistance system by which a precise estimation of a pose of a motor vehicle in the surroundings of the motor vehicle may be realized.

This object is solved by a method, a computer program product, and an assistance system according to the independent claims. Advantageous forms of combination are presented in the dependent claims.

One aspect of the invention relates to a method for correcting a pose of a motor vehicle in the surroundings of the motor vehicle by an assistance system of the motor vehicle. First data of semantic contour image measurements are received by an electronic computing device of the assistance system. Second data of an initial pose estimate are received by the electronic computing device. Third data of semantically labeled map elements are received by the electronic computing device. A score image and/or an error image and its image derivates based on the first data are generated by the electronic computing device. Expected three-dimensional points of the map elements at the initial pose estimate based on the second data and third data are generated by the electronic computing device. The expected three-dimensional points of the map elements are compared with the score image and/or the error image and its image derivatives to perform model-to-image alignment by the electronic computing device. Based at least in part on projecting the expected three-dimensional points into the score image and/or the error image, the expected three-dimensional points are projected at least in part into the score image and/or the error image, and the score image and/or the error image and its image derivatives are used to perform an iterative optimization by the electronic computing device. The alignment's resulting pose correction and pose correction uncertainty are transmitted to the assistance system.

Therefore, a way of utilizing this information, in particular semantic information, more effectively is presented. While other methods also offer semantic localization via image-to-model alignment, this method is more easily generalizable to include a wide variety of semantic classes. This is because the method is most diagnostic with respect to the semantic classes utilized. Furthermore, the method is particularly suited for "sparse maps", in particular maps that contain extracted landmark features of dense point clouds or captured images. This method operates completely in the image space, for example, it does not require corresponding measurements of depth.

From an implementation point of view, the method uniquely utilizes "unfilled" semantic contours. This ensures that a problem is sufficiently constrained. Furthermore, the method utilizes a correspondence-free registration by calculating the spatial derivatives of a continuous error/score image. The correspondence-free approach avoids the issues associated with incorrect point correspondences.

According to an embodiment, the semantic contour image is captured by a monocular camera of the assistance system. The semantic image contour describes the boundaries of each detected object instance in the monocular camera image as well as the instance's semantic classification. The method in particular depends on semantic image contours of an on-board monocular camera that are provided while driving. These contours serve as a critical measurement that provides information regarding the vehicle's pose, in particular its position and orientation.

In another embodiment, in the semantic contour image, a semantic classification of objects is performed by the electronic computing device. More specifically, semantic classifications may, for example, include, but are not limited to, roads, poles, pedestrians, sidewalks, trees, cars et cetera. Specifically, the contours are a list of each object's instance boundary's image pixel locations.

In another embodiment, the semantically labeled map comprises at least one labeled landmark as map element, in particular the labeled landmark is dependent on raw measurements from a capturing device of the assistance system. For example, lane markers may be represented as a series of polyline points instead of millions of individual intensity measurements. Furthermore, pole-like objects may be represented simply as a cylinder with a bottom point location, a top point location, and a cylinder radius. In all, these landmarks are stored with their semantic classification, their three-dimensional pose, and the minimum set of attributes required to fully define the semantic class in a three-dimensional space. This three-dimensional information encoded in these map landmarks gives the method the freedom to utilize a monocular camera, since monocular cameras may not directly capture depths. Consequently, this method depends on semantically labeled map landmarks from a pre-built map.

According to another embodiment, the pose correction is used for a localization of the motor vehicle by the assistance system. In particular, the localization may be used for an at least in part autonomous operation or a fully autonomous operation of a motor vehicle. Therefore, a more secure operation of an at least in part autonomous motor vehicle may be realized with the method.

In another embodiment, the pose correction is performed by the electronic computing device in six degrees of freedom. In particular, this method calculates a correction for the provided initial pose estimate. This is critical for improved accuracy when integrated within a larger localization framework. This can serve as one of the many measurements that are integrated and fused within a larger framework. Specifically, this method may calculate pose corrections in all six degrees of freedom, for example, three translational and three rotational degrees of freedom. Therefore, more precise locations of the motor vehicle may be realized.

In another embodiment, the semantically labeled map is a sparse map of the surroundings. In particular, the method depends on the pre-built sparse map. While a “dense” map contains raw measurements, for example, from a lidar sensor, so-called point clouds or camera images for each map location, a sparse map contains landmarks that were extracted from these raw measurements. For example, lane markers may be represented as a series of polyline points instead of millions of individual intensity measurements. In all, these landmarks are stored with their semantic classification, their three-dimensional pose, and the minimum set of attributes required to fully define the semantic class in a three-dimensional space. Thus, sparse maps have the advantage of vastly reduced data storage/transmission costs. The map representation also changes the types of algorithms that the motor vehicle has to execute online. For example, it can be advantageous to use algorithms that rely on high-level abstractions.

According to another embodiment, the method is a correspondence-free method without correspondences between landmarks and measured features in the surroundings. Many localization methods, in particular those which depend on sparse maps, are correspondence-based. In other words, they establish correspondences or associations between map landmarks and measured features. These correspondences are typically established based on a distance metric. Specifically, given the initial pose estimate, map landmarks are transformed into “expected” features. Then, associations are made between the measured and expected features that are closest to each other. Ideally, the measured and expected features perfectly align, indicating a perfect pose estimate. In reality localization frameworks attempt to minimize these distances, more formally called errors or residuals, to converge to an accurate pose estimate. For this reason, correct correspondences are critical for an accurate pose estimate. Unfortunately, the methodology to establish correspondences is non-trivial. It is often the defining factor of a method’s success or failure. Establishing correspondences is notoriously difficult for map landmarks that are clustered because slight perturbations of the initial pose estimate could result in widely varying correspondences. Consequently, this method is developed to address the aforementioned difficulties. Most notably, it is a correspondences-free method. Theoretically, it is more robust for scenarios in which incorrect correspondences are likely, for example, scenarios with clustered landmarks. In other words, this method can align cluster of poles with a cluster of expected map poles but never attempts to establish correspondences with individual poles. The only requirement is that it matches the observed semantic classes with semantic classes represented in the map.

In particular, the method is a computer-implemented method. Therefore, another aspect of the invention relates to a computer program product comprising program code means, which, when they are executed by an electronic computing device, cause the electronic computing device to perform a method according to the preceding aspect.

Another aspect of the invention relates therefore to a computer-readable storage medium.

Furthermore, the invention relates to an assistance system for correcting a pose of a motor vehicle, comprising at least one electronic computing device, wherein the assistance system is configured to perform a method according to the preceding aspect. In particular, the method is performed by the assistance system.

The electronic computing device may comprise means, for example, processors or electronic circuits, for performing the method.

A still further aspect of the invention relates to a motor vehicle comprising the assistance system, wherein the motor vehicle is at least in part autonomous.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

BRIEF DESCRIPTION OF THE DRAWINGS

The novel features and characteristic of the disclosure are set forth in the appended claims. The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

The drawings show in.

In the figures the same elements or elements having the same function are indicated by the same reference signs.

DETAILED DESCRIPTION

Figure 1:
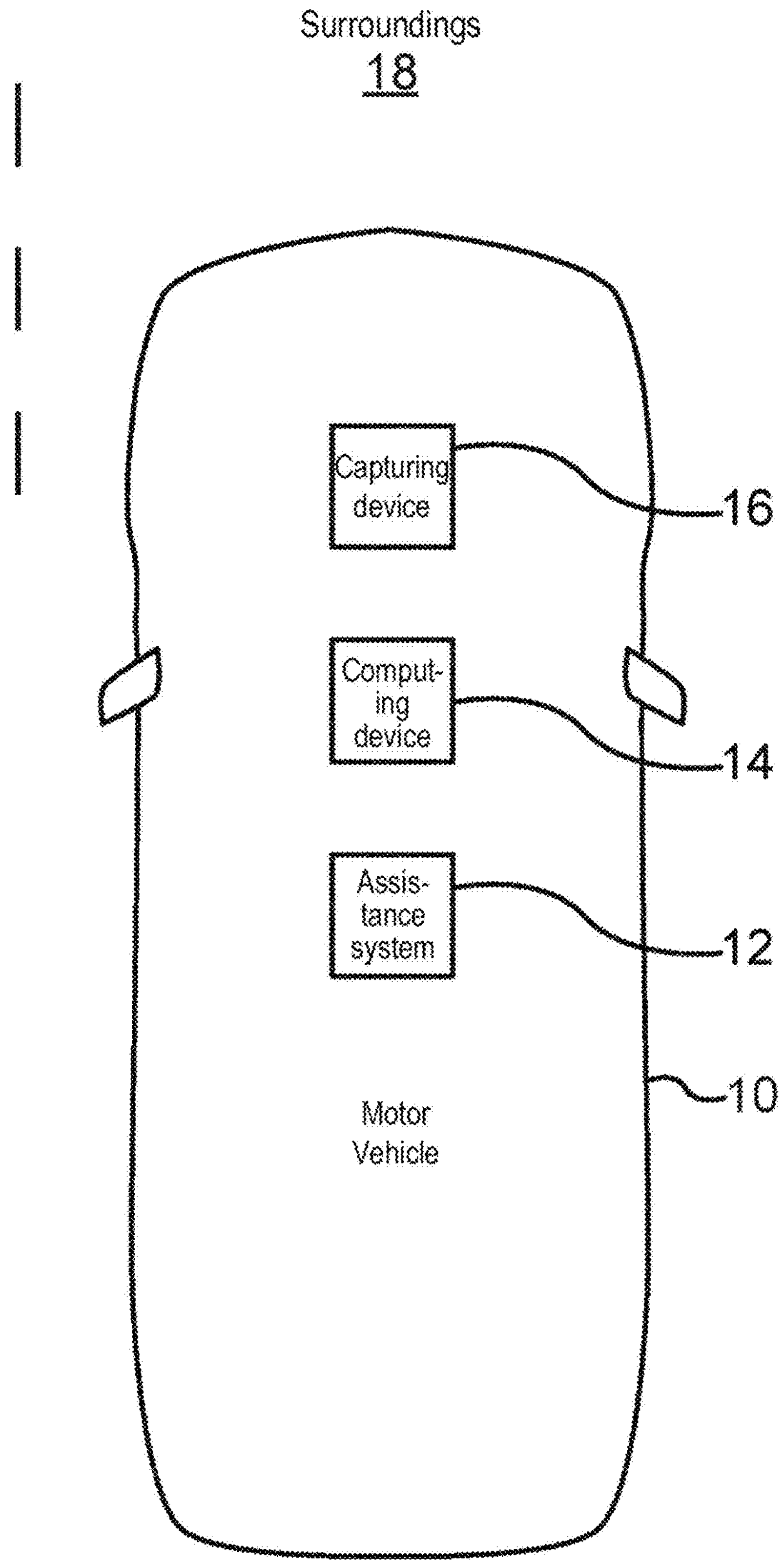
FIG. 1 a schematic top view of an embodiment of a motor vehicle comprising an embodiment of an assistance system.

In the present document, the word “exemplary” is used herein to mean “serving as an example, instance, or illustration”. Any embodiment or implementation of the present subject matter described herein as “exemplary” is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms “comprises”, “comprising”, or any other variations thereof, are intended to cover a non-exclusive inclusion so that a setup, device or method that comprises a list of components or steps does not include only those components or steps but may include other components or steps not expressly listed or inherent to such setup or device or method. In other words, one or more elements in a system or apparatus preceded by “comprises” or “comprise” does not or do not, without more constraints, preclude the existence of other elements or additional elements in the system or method.

In the following detailed description of the embodiment of the disclosure, reference is made to the accompanying drawings that form part hereof, and in which is shown by way of illustration a specific embodiment in which the disclosure may be practiced. This embodiment is described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows a schematic top view according to an embodiment of a motor vehicle 10. The motor vehicle 10 may be at least in part autonomous or fully autonomous. The motor vehicle 10 comprises an assistance system 12. The assistance system 12 comprises at least an electronic computing device 14. Furthermore, the assistance system 12 may comprise a capturing device 16 for capturing the surroundings 18 of the motor vehicle 10. The capturing device 18 may be, for example, a monocular camera.

Figure 2:
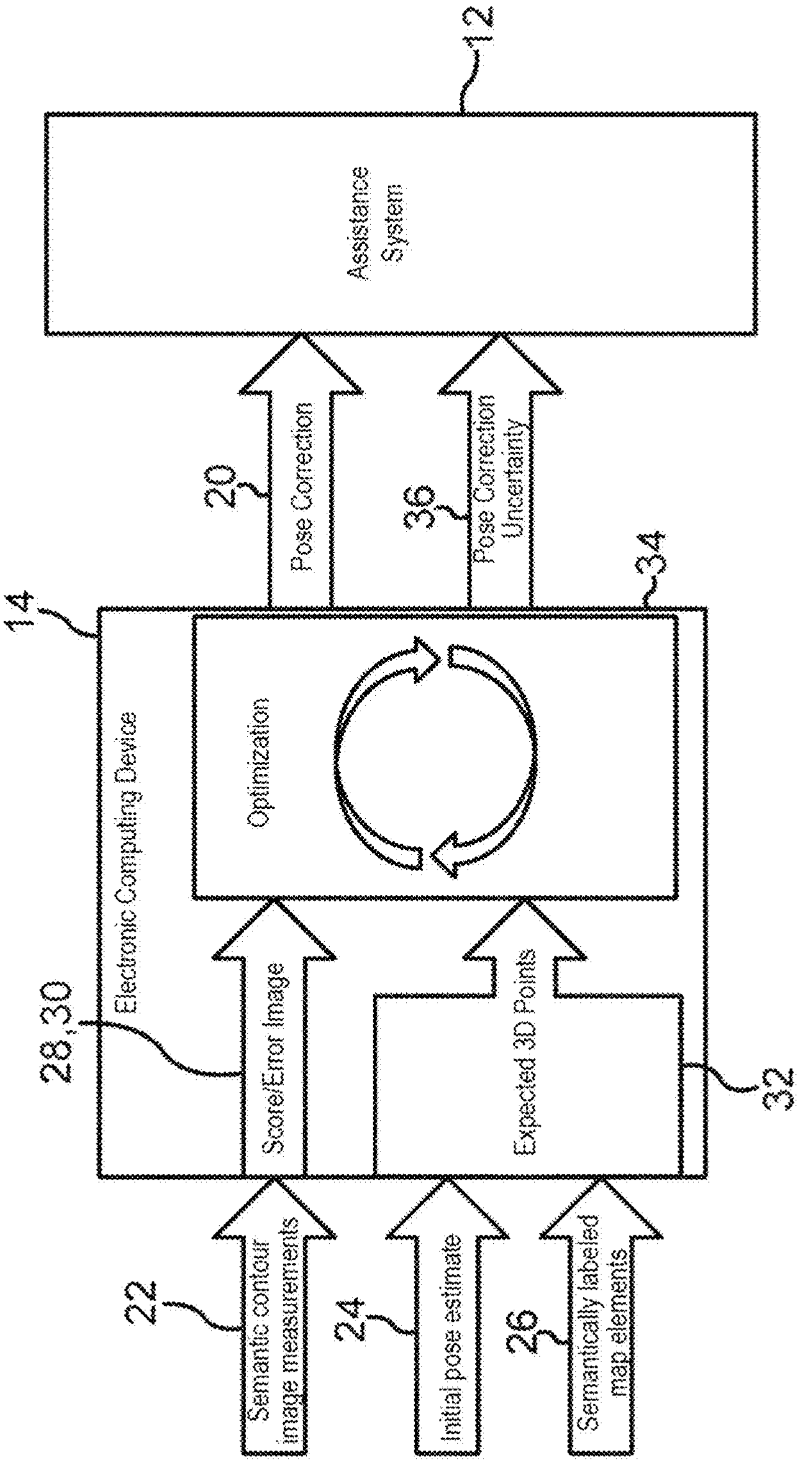
FIG. 2 a schematic flow chart according to an embodiment of the method.

FIG. 2 a schematic flow chart according to an embodiment of the method. In particular, FIG. 2 shows a method for pose correction 20 of the motor vehicle 10 in the surroundings 18 of the motor vehicle 10 by the assistance system 12. Receiving first data 22 of the semantic contour image measurements is performed by the electronic computing device 14. Second data 24 of an initial pose estimate are received by the electronic computing device 14. Third data 26 of semantically labeled map elements are received by the electronic computing device 14. Generating a score image 28 and/or an error image 30 and its image derivatives based on the first data 22 is performed by the electronic computing device 14. Expected three-dimensional (3D) points 32 of the map elements at the initial pose estimate are generated based on the second data 24 and third data 26 by the electronic computing device 14. Comparing the expected three-dimensional points 32 of the map elements with the score image 28 and/or the error image 30 and its image derivatives to perform model-to-image alignment 34 is performed by the electronic computing device 14. Based at least in part on projecting the expected three-dimensional points 32 into the score image 28 and/or the error image 30 and using the score image 28 and/or error image 30 and its image derivatives to perform an iterative optimization 34 is performed by the electronic computing device 14. The alignments resulting in pose correction 20 and pose correction uncertainty 36 are transmitted to the assistance system 12, wherein the assistance system 12, in particular the pose correction 20, is used for localization of the motor vehicle 10 by the assistance system 12.

The semantic image contours describe the boundaries of each detected object instance in the monocular camera image as well as the instance's semantic classification. Semantic classifications include, but are not limited to: roads, poles, pedestrians, sidewalks, trees, cars, etc. Specifically, the contours are a list of each object instance boundary's image pixel locations. This method depends on semantic image contours of an onboard monocular camera that are provided while driving. These contours serve as a critical measurement that provides information regarding the vehicle's pose, which corresponds to position and orientation.

Autonomous vehicle localization aims to estimate the vehicle's pose. It fundamentally operates by converging to the pose that makes the sensor measurements consistent with what is expected based on a pre-built map. Thus, these "expected" measurements are generated based on an initial estimate of the vehicle's pose. Consequently, each additional sensor measurement helps (partially or fully) correct the initial pose estimate. Continuous corrections result in a more accurate (and more certain) pose estimate. Similarly, this method corrects the pose estimate given an initial pose estimate.

This method depends on a pre-built "sparse" map. While a "dense" map contains raw measurements (e.g. LIDAR point clouds, camera images, etc.) for each map location, a "sparse" map contains landmarks that were extracted from these raw measurements. For example, lane markers may be represented as a series of polyline points instead of millions of individual intensity measurements. Furthermore, pole-like objects may be represented simply as a cylinder with a bottom point location, a top point location, and a cylinder radius. In all, these landmarks are stored with their semantic classification, their 3D pose, and the minimum set of attributes required to fully define that semantic class in a 3D space. Thus, sparse maps have the advantage of vastly reduced data storage/transmission costs. The map representation also changes the types of algorithms that the vehicle must execute online. For example, it can be advantageous to use algorithms that rely on high-level abstractions.

It is noteworthy that the 3D information encoded in these map landmarks gives this method the freedom to utilize a monocular camera since monocular cameras cannot directly capture depth.

Consequently, this method depends on semantically labeled map landmarks from a pre-built sparse map.

This method calculates and outputs a "pose correction" for the provided initial pose estimate. This is critical for improved accuracy when integrated within a larger localization framework. This can serve as one of the many measurements that are integrated and fused within the larger framework of the assistance system 12.

Specifically, this method can calculate pose corrections in all six degrees of freedom, in particular three translational and three rotational degrees of freedom.

This method can either provide a "pose correction" or a "corrected pose" estimate. That distinction is a trivial implementation detail.

Sensor fusion frameworks fundamentally depend on measurements in addition to the measurement's corresponding uncertainty for all measurements to be fused in an optimal manner. Since the measurement uncertainty can be very environment-dependent, this is a critical attribute for communicating the uncertainty for each specific measurement. Furthermore, it can denote if high uncertainties in certain degrees of freedom, for example measurements of vertical poles may result in large uncertainties of the vehicle's height.

Thus, this method also provides the uncertainties that correspond to its pose correction 20.

Many localization methods, particularly those that depend on sparse maps, are "correspondence-based." In other words, they establish "correspondences" or "associations" between map landmarks and measured features. These correspondences are typically established based on a distance metric. Specifically, given the initial pose estimate, map landmarks are transformed into "expected" features. Then, associations are made between the measured and expected features that are closest to each other. Ideally, the measured and expected features perfectly align, indicating a perfect pose estimate. In reality, localization frameworks attempt to minimize these distances, more formally called errors or residuals, to converge to an accurate pose estimate.

For this reason, correct correspondences are critical for an accurate pose estimate. Unfortunately, the methodology to establish correspondences is non-trivial. It is often the defining factor of a method's success or failure. Establishing correspondences is notoriously difficult for map landmarks that are clustered because slight perturbations of the initial pose estimate could result in widely varying correspondences.

Furthermore, when minimizing the residuals, not all degrees of freedom should be treated equally. This is particularly true for landmarks that are symmetric about a degree of freedom. For example, most sections of metallic poles look identical whether they are 2 feet or 8 feet off the ground. Thus, if you can only observe a section of a metallic pole, you may be able to gather critical information about the vehicle's planar position and heading, but you are unable to determine the vehicle's height from the ground. Knowledge about the degrees of freedom are critical to avoid the inclusion of "false" constraints. This can be accounted for by implementing "specialized" error metrics that take advantage of high-level abstractions. However, these error metrics can fail when the high-level abstractions fail. Furthermore, this can become more difficult as more and more complex semantic classes are added.

Consequently, this method is developed to address the aforementioned difficulties. Most notably, it is a "correspondence-free" method. It is more robust for scenarios in which incorrect correspondences are likely, for example scenarios with clustered landmarks. In other words, this method can align cluster of poles with a cluster of expected (map) poles, but never attempts to establish correspondences with individual poles. The only requirement is that it matches the observed semantic classes with the semantic classes represented in the map.

It is also notable that this method is mostly agnostic to the semantic classes utilized. Due to its unique methodology, it does not require specialized error metrics so that it is generalizable to include a wide variety of different semantic classes. For example, if only a section of pole is observed, this method's error metric will inherently leave the vehicle height unconstrained. Furthermore, since this method's error metric does not depend on high-level abstractions, it is relatively robust to the inaccuracies present in semantic contour measurements. Combined, this yields a method that is scalable to many complex semantic classes beyond lane markings and pole-like objects. This sub-process is critical for the "correspondence-free" nature of this method. It generates a continuous error/score image 28, 30 from the semantic contour measurements. In other words, this image stores error or score values as its pixel values. The semantic contours correspond to image pixels with a "high score" or a "zero error". As one moves farther and farther away from the semantic contour pixels, the score decreases or the error increases.

Later, map elements will be projected onto these images and will be assigned the error/score of their projected pixels. Thus, this image efficiently serves as a "lookup table" for the error/score so it does not need to be calculated for every iteration. This method adjusts the pose so that the map elements project to pixels with a low error or a high score. By doing so, it will have aligned the measurement with the expected map features, correcting the pose estimate.

This method then efficiently and directly calculates these images' spatial derivatives. The spatial derivatives are critical for indicating the "direction" of the pose change in every iteration of the optimization process. Consequently, these images were specifically created so that they emulate a continuous "surface," a necessary requirement for valid spatial derivatives. Thus, these spatial derivative images also serve as an efficient "lookup table" during the optimization process.

The next sub-process is to generate expected 3D points 32 from the initial pose estimate and map landmarks. The 3D points 32 are generated from the initial pose estimate's point-of-view. Thus a pose that is closer to a map landmark generates closer 3D points 32. The only requirement is that the 3D points 32 must correspond to a landmark's visibility boundaries.

As long as the above requirements are met, this sub-process is invariant to the algorithm that produced it. This is important as different map representations may require different algorithms for producing these 3D points 32.

This optimization sub-process requires two internal inputs: The generated score/error images 28, 30 and their corresponding spatial derivative images. Furthermore, the generated expected 3D points 32 of map landmarks are used.

First, the expected 3D points 32 are projected onto the generated score/error images 28, 30. Using the image as a "lookup table," each point is then assigned its error/score metric. Furthermore, the 3D points 32 are projected onto a??? spatial derivative image. Again using this image as a "lookup table," the 3D points 32 are also assigned spatial derivatives. Using the 3D information from the 3D points 32, these spatial derivatives are transformed into an error/score Jacobian.

The error/scores and the error/score Jacobians are then used by the iterative optimizer to compute an initial pose correction 20. This pose correction 20 is then applied to the initial pose estimate. This new pose is then used to transform the 3D points 32 so that they project into different image pixels. This results in different error/scores and error/score Jacobians. Thus, this iterative cycle repeats until the pose corrections 20 stop changing; the final pose correction 20 has been found and is published for use by the assistance system 12.

While all semantic image contours are visualized in the same image, the semantic classes are actually divided into separate images behind-the-scenes to prevent semantic cross-contamination. Despite their separation, they are able to collectively constrain the pose correction 20.

Figure 3:
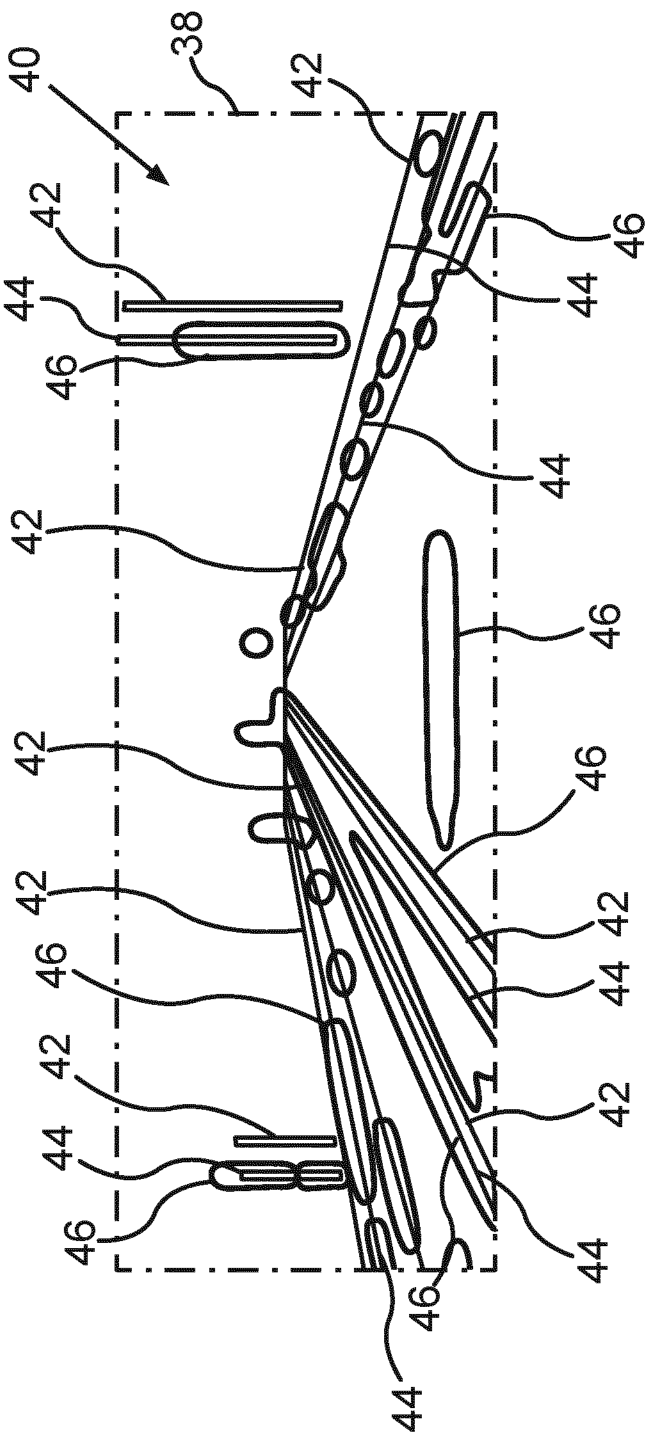
FIG. 3 a schematic image generated according to an embodiment of the method.

FIG. 3 shows a schematic image 38 according to an embodiment of the method. In particular, a visualization of the correctly estimated pose correction 20 from real data of an urban scene 40 is presented. The underlying image represents the continuous score image 28 generated from the measured semantic contours. The points represented by the reference sign 42 represents the expected three-dimensional points 32 projected into the image from the initial pose estimate. The points with reference sign 44 are the expected three-dimensional points 32 projected into the image from the corrected pose estimate. The points with reference sign 44 are overlaying with the high-score region 46 of the continuous score image 28, indicating that the pose corrections 20 are accurate.

REFERENCE SIGNS

10 motor vehicle
12 assistance system
14 electronic computing device
16 capturing device
18 surroundings
20 pose correction
22 first data
24 second data
26 third data
28 score image
30 error image

32 expected three-dimensional points
34 optimization
36 pose correction uncertainty
38 image
40 urban scene
42 points
44 points

The invention claimed is:

1. A method of a motor vehicle using assistance system of the motor vehicle during driving of the motor vehicle to travel within surroundings of the vehicle, the assistance system including a computer that comprises one or more processors, the method comprising: receiving, by the computer and from at least one camera of the motor vehicle that captures images of the surroundings during the driving of the motor vehicle, first data of semantic contour image measurements representing boundaries of detected object instances in the surroundings; receiving, by the computer, second data of an initial pose estimate; receiving, by the computer, third data of semantically labeled map elements, wherein the semantically labeled map elements comprise a semantic map of three-dimensional landmark information associated with semantic classifications; generating, by the computer and based on the semantic contour image measurements, a continuous score image that represents a two-dimensional field of pixel-wise values that represent errors, the pixel-wise values being in an image space in which pixels corresponding to the semantic contours have relatively higher ones of the values, which represent low error, and pixels at increasing distances from the semantic contours are assigned lower values representing higher error, a distribution of the values throughout the image space forming a continuous gradient; generating, by the computer, spatial image derivative values of the continuous score image; generating, by the computer, expected three-dimensional points of the map elements at the initial pose estimate based on the second data and third data; projecting, by the computer, the expected three-dimensional points into a two-dimensional image plane associated with the continuous score image based on the initial pose estimate, thereby obtaining corresponding two-dimensional points; assigning, by the computer and to the corresponding two-dimensional points, respective ones of the pixel-wise values of the continuous score image and corresponding ones of the spatial derivative values by performing a lookup in the continuous score image at pixel locations of the corresponding two-dimensional points within the continuous score image; iteratively updating, by the computer, the pose of the motor vehicle by performing an optimization based on the assigned values from the continuous score image and the corresponding spatial derivative values, including determining a pose update direction based on the gradient represented by the spatial derivative values and updating the pose estimate in successive iterations until an optimized pose is ascertained; and performing, by the computer, an autonomous vehicle operation of the assistance system by controlling operation of the motor vehicle according to the ascertained optimized pose.

2. The method according to claim 1, wherein the at least one camera is a monocular camera.

3. The method according to claim 1 wherein the first data includes a semantic classification of objects.

4. The method according to claim 1, wherein the semantically labeled map comprises, as at least one map element, at least one labeled landmark that is dependent on raw measurements of the assistance system.

5. The method according to claim 1, further comprising localizing the motor vehicle based on the optimized pose, the localization being used by the assistance system for performing the autonomous vehicle operation.

6. The method according to any one of claims claim 1, wherein the pose updating is performed with respect to six degrees of freedom.

7. The method according to claim 1, wherein the semantically labeled map is a sparse map of the surroundings.

8. The method according to claim 1, wherein the method is a correspondence-free method without correspondences between landmarks and measured features in the surroundings.

9. The method of claim 1, further comprising: determining, by the computer, a pose uncertainty associated with the ascertained optimized pose, wherein the pose uncertainty is derived from the optimization outputs and reflects environment-dependent measurement uncertainty and sensitivity of assigned scores or errors to variations in the pose estimate; and performing, by the computer, sensor fusion that fuses the ascertained optimized pose with pose measurements from one or more additional sensors according to the determined pose uncertainty, wherein the pose uncertainty is used to indicate degrees of freedom that are poorly constrained by the optimized pose.

10. An assistance system of a motor vehicle, the assistance system comprising: at least one camera that captures images of the surroundings during driving of the motor vehicle by which the motor vehicle travels within surroundings of the vehicle; and a computer that include one or more processors, wherein the computer is configured to perform the following during the driving of the motor vehicle: receive, from the at least one camera, first data of semantic contour image measurements representing boundaries of detected object instances in the surroundings receive second data of an initial pose estimate; receive third data of semantically labeled map elements, wherein the semantically labeled map elements comprise a semantic map of three-dimensional landmark information associated with semantic classifications; generate, based on the semantic contour image measurements, a continuous score image that represents a two-dimensional field of pixel-wise values that represent errors, the pixel-wise values being in an image space in which pixels corresponding to the semantic contours have relatively higher ones of the values, which represent low error, and pixels at increasing distances from the semantic contours are assigned lower values representing higher error, a distribution of the values throughout the image space forming a continuous gradient; generate spatial derivative values of the continuous score image; generate expected three-dimensional points of the map elements at the initial pose estimate based on the second data and third data; project the expected three-dimensional points into a two-dimensional image plane associated with the continuous score image based on the initial pose estimate, thereby obtaining corresponding two-dimensional points; assign, to the corresponding two-dimensional points, respective ones of the pixel-wise values of the continuous score image and corresponding ones of the spatial derivative values by performing a lookup in the continuous score image at pixel locations of the corresponding two-dimensional points within the continuous score image; iteratively update the pose of the motor vehicle by performing an optimization based on the assigned values from the continuous score image and the corresponding spatial derivative values, including determining a pose update direction based on the gradient represented by the spatial derivative values and updating the pose estimate in successive iterations until an optimized pose is ascertained; and perform an autonomous vehicle operation of the assistance system by controlling operation of the motor vehicle according to the ascertained optimized pose.

11. A non-transitory computer-readable medium on which are stored instructions that are executable by a processor of an assistance system of a motor vehicle, and that, when executed by the processor, cause the processor to perform a method during driving of the motor vehicle to travel within surroundings of the vehicle, the method comprising: receiving, from at least one camera of the motor vehicle that captures images of the surroundings during the driving of the motor vehicle, first data of semantic contour image measurements representing boundaries of detected object instances in the surroundings; receiving second data of an initial pose estimate; receiving third data of semantically labeled map elements, wherein the semantically labeled map elements comprise a semantic map of three-dimensional landmark information associated with semantic classifications; generating, based on the semantic contour image measurements, a continuous score image that represents a two-dimensional field of pixel-wise values that represent errors, the pixel-wise values being in an image space in which pixels corresponding to the semantic contours have relatively higher ones of the values, which represent low error, and pixels at increasing distances from the semantic contours are assigned lower values representing higher error, a distribution of the values throughout the image space forming a continuous gradient; generating spatial derivative values of the continuous score image; generating expected three-dimensional points of the map elements at the initial pose estimate based on the second data and third data; projecting the expected three-dimensional points into a two-dimensional image plane associated with the continuous score image based on the initial pose estimate, thereby obtaining corresponding two-dimensional points; assigning, to the corresponding two-dimensional points, respective ones of the pixel-wise values of the continuous score image and corresponding ones of the spatial derivative values by performing a lookup in the score image at pixel locations of the corresponding two-dimensional points within the continuous score image; iteratively updating the pose of the motor vehicle by performing an optimization based on the assigned values from the continuous score image and the corresponding spatial derivative values, including determining a pose update direction based on the gradient represented by the spatial derivative values and updating the pose estimate in successive iterations until an optimized pose is ascertained; and performing an autonomous vehicle operation of the assistance system by controlling operation of the motor vehicle according to the ascertained optimized pose.

* * * * *